(12) United States Patent
Kobayashi et al.

(10) Patent No.: US 9,457,503 B2
(45) Date of Patent: Oct. 4, 2016

(54) APPARATUS FOR PRODUCING MOLDED ARTICLE OF FIBER-REINFORCED PLASTIC

(71) Applicant: HONDA MOTOR CO., LTD., Tokyo (JP)

(72) Inventors: Masatoshi Kobayashi, Utsunomiya (JP); Masaki Namaizawa, Wako (JP); Makoto Nasu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 13/952,910

(22) Filed: Jul. 29, 2013

(65) Prior Publication Data

US 2014/0061980 A1 Mar. 6, 2014

(30) Foreign Application Priority Data

Aug. 28, 2012 (JP) .................................. 2012-187578

(51) Int. Cl.
| | |
|---|---|
| B29C 45/03 | (2006.01) |
| B29C 45/14 | (2006.01) |
| B29C 45/02 | (2006.01) |
| B29C 45/04 | (2006.01) |
| B29C 45/56 | (2006.01) |
| B29C 33/00 | (2006.01) |
| B29C 45/00 | (2006.01) |
| B29C 70/46 | (2006.01) |
| B29C 45/34 | (2006.01) |

(52) U.S. Cl.
CPC ..... *B29C 45/14631* (2013.01); *B29C 33/0038* (2013.01); *B29C 45/0005* (2013.01); *B29C 45/02* (2013.01); *B29C 45/03* (2013.01); *B29C 45/0408* (2013.01); *B29C 45/561* (2013.01); *B29C 70/467* (2013.01); *B29C 45/34* (2013.01)

(58) Field of Classification Search
None
See application file for complete search history.

(56) References Cited

U.S. PATENT DOCUMENTS

| | | | |
|---|---|---|---|
| 4,767,308 A | 8/1988 | Adams | |
| 5,023,041 A * | 6/1991 | Jones | B29C 33/0055 164/80 |
| 5,433,915 A * | 7/1995 | Yamamoto | B29C 33/0055 264/102 |

FOREIGN PATENT DOCUMENTS

| | | | |
|---|---|---|---|
| DE | 102007046734 | * | 4/2009 |
| DE | 102012204136 | | 9/2013 |
| DE | 102013000307 | * | 7/2014 |
| DE | 102013214111 | * | 1/2015 |

(Continued)

OTHER PUBLICATIONS

Japanese Office Action with partial English translation, dated Jul. 21, 2015, 4 pages.

(Continued)

*Primary Examiner* — Edmund Lee
(74) *Attorney, Agent, or Firm* — Rankin, Hill & Clark LLP (57) ABSTRACT

A first sealing member and a second sealing member are disposed respectively on a lower mold and an upper mold. During a process of closing the lower mold and the upper mold, a gap between the molds is sealed by the first sealing member, thereby forming an enclosed space between the molds. Thereafter, a gas in the enclosed space is discharged. As the closing process progresses, the enclosed space is divided by the second sealing member into a sealed room and a production cavity, followed by a liquid resin being supplied to the production cavity.

6 Claims, 9 Drawing Sheets

(56) References Cited

FOREIGN PATENT DOCUMENTS

| | | | |
|---|---|---|---|
| JP | 59148634 | * | 8/1984 |
| JP | 62-170307 | | 7/1987 |
| JP | 2002-192535 | | 7/2002 |
| JP | 2006-341536 | | 12/2006 |
| JP | 4414801 | | 2/2010 |

OTHER PUBLICATIONS

German Search Report with English Translation dated Oct. 13, 2014, 16 pages.

German Office Action with English Translation dated Oct. 13, 2014, 9 pages.

* cited by examiner

FIG. 9

APPARATUS FOR PRODUCING MOLDED ARTICLE OF FIBER-REINFORCED PLASTIC

CROSS-REFERENCE TO RELATED APPLICATION

This application is based upon and claims the benefit of priority from Japanese Patent Application No. 2012-187578 filed on Aug. 28, 2012, the contents of which are incorporated herein by reference.

BACKGROUND OF THE INVENTION

1. Field of the Invention

The present invention relates to a method and an apparatus for impregnating a base fiber material with a liquid resin to produce a molded article from a fiber-reinforced plastic.

2. Description of the Related Art

Fiber-reinforced plastics, which are composites made of base fibers and resins, have been known as lightweight high-strength materials. Molded articles produced from such fiber-reinforced plastics have recently been used in components for car bodies and airplanes.

Molded articles made from fiber-reinforced plastics (hereinafter referred to as molded FRP articles) can be produced, for example, by an RTM (Resin Transfer Molding) method. In the RTM method, as described in Japanese Laid-Open Patent Publication No. 2002-192535, a base fiber material is placed in a mold cavity, the mold is closed, gas in the cavity is discharged, and then a liquid resin is supplied to the cavity.

In certain cases, a molded FRP article is required to have a large thickness in excess of 10 mm, or a relatively high fiber content of about 50% by volume. If such molded FRP articles are produced using an RTM method, the base fiber material exhibits a high resistance against flow of the liquid resin. Therefore, the liquid resin may be spread insufficiently over the base fiber material, so that the base fiber material is insufficiently impregnated with the resin, thereby generating an unimpregnated area. The molded FRP article with such an unimpregnated area has insufficient strength and cannot be used as a satisfactory product.

As is clear from the above, in the RTM method, disadvantageously, it is difficult to produce a molded FRP article having a large thickness or a high fiber content with high yield.

Japanese Patent No. 4414801 proposes a technique in which liquid resin is supplied to a cavity between lower and upper molds during a process of changing the lower and upper molds from an open state to a closed state. Thereafter, gas that exists in an enclosed space formed by the lower and upper molds is vented. As described in Japanese Patent No. 4414801, according to this technique, since the cavity is placed under a negative pressure, the liquid resin can be spread in a short time and the base fiber material can readily be impregnated with the liquid resin.

SUMMARY OF THE INVENTION

With the techniques described in Japanese Laid-Open Patent Publication No. 2002-192535 and Japanese Patent No. 4414801, the liquid resin is spread under a reduced pressure. Therefore, the liquid resin often is drawn into an exhaust passage. Thus, the amount of liquid resin cannot be increased sufficiently in the production cavity, so that it becomes difficult to prevent occurrence of an unimpregnated area.

Furthermore, the drawn liquid resin may become hardened in the exhaust passage. In this case, in a subsequent molding, the inspiratory force is reduced due to the hardened resin, and thus it is difficult to increase the degree of vacuum. To solve this problem, a valve may be formed at the outlet of the exhaust passage, and the valve may be closed after the gas has been discharged. However, if the liquid resin has a low viscosity, the liquid resin may be introduced and become hardened inside the valve. In such a case, it is necessary to take apart and clean or to replace the valve. The molding method cannot be performed during such a procedure, and therefore it is difficult to improve production efficiency of the molded FRP article.

A principal object of the present invention is to provide a method for producing a molded article of a fiber-reinforced plastic, which is capable of preventing liquid resin from being drawn into the exhaust passage, thereby improving production efficiency.

Another object of the present invention is to provide a molding apparatus for producing a molded article of a fiber-reinforced plastic.

According to an aspect of the present invention, there is provided a molding apparatus comprising a lower mold, an upper mold, and an exhaust unit for impregnating a base fiber material with a liquid resin in a cavity defined between the lower mold and the upper mold, in order to produce a molded article of a fiber-reinforced plastic.

A first sealing member and a second sealing member are disposed respectively on the lower mold and the upper mold or both the first sealing member and the second sealing member are disposed on the lower mold or the upper mold, and at least one of the lower mold and the upper mold has an exhaust passage.

When the upper mold is relatively lowered toward the lower mold, the first sealing member is used to form an enclosed space containing a production cavity between the lower mold and the upper mold.

After formation of the enclosed space and when the upper mold is relatively lowered further toward the lower mold, the second sealing member is used to divide the enclosed space into the production cavity and a sealed room. The sealed room is formed between the first sealing member and the second sealing member, and communicates with the exhaust passage.

Prior to formation of the sealed room, a gas in the enclosed space is discharged from the exhaust passage by the exhaust unit.

In such a structure, prior to achievement of the closed state, the enclosed space is formed between the lower mold and the upper mold, and the gas in the enclosed space is discharged. Thereafter, as the closing process progresses, the enclosed space is divided into the sealed room and the production cavity. Liquid resin is supplied to the production cavity under a negative pressure, and the upper mold is pressed against the liquid resin. Therefore, the liquid resin can readily be spread over the entire base fiber material. Thus, a molded FRP article having a large thickness or a high fiber volume content can easily be produced.

In the case that the liquid resin is excessively supplied above the base fiber material, the liquid resin is blocked by the second sealing member. Therefore, the liquid resin can be prevented from leaking outside from the production cavity. Thus, lack of liquid resin due to leakage thereof can be prevented, and the occurrence of an unimpregnated area in the molded FRP article can be prevented. Consequently, a molded FRP article of satisfactory strength can be produced with a high yield.

Furthermore, since the liquid resin is blocked by the second sealing member, the liquid resin can be prevented from being drawn into the sealed room and the exhaust passage that communicates with the sealed room. Thus, the resin can be prevented from being discharged outside of the production cavity, and a reduction in the inspiratory force in a subsequent molding can be prevented.

In addition, even in the case that a valve is formed in the exhaust passage, it is not necessary to take apart and clean or to replace the valve. For these reasons, a greater number of moldings can be performed per unit time, so that production efficiency of the molded FRP articles can be improved.

Thus, in the present invention, molded FRP articles having a large thickness or a high fiber volume content can be produced efficiently with satisfactory strength and high yield.

The base fiber material may be placed in the production cavity, which is divided by the second sealing member.

The above structure preferably further comprises a sealed room opening unit capable of opening the sealed room to atmosphere by way of the exhaust passage. After the production cavity and the sealed room are formed by the second sealing member, the sealed room may be opened to atmosphere (may be placed under atmospheric pressure), and thereafter supply of the liquid resin may be carried out. In this case, if the liquid resin cannot be blocked sufficiently due to a defect in the second sealing member, the liquid resin is pressed by atmospheric air due to the fact that the production cavity is under a negative pressure.

Thus, in this case, liquid resin can further be effectively prevented from being drawn into the sealed room and the exhaust passage.

The sealed room opening unit preferably comprises a three-way valve.

One of the lower mold and the upper mold may have a protruding portion, and another of the lower mold and the upper mold may have a depressed insertion portion into which the protruding portion is inserted. In this case, for example, one of the first sealing member and the second sealing member may be disposed on one of the protruding portion and the insertion portion, whereas another of the first sealing member and the second sealing member may be disposed on another of the protruding portion and the insertion portion.

Alternatively, both the first sealing member and the second sealing member may be disposed on one of the protruding portion and the insertion portion.

According to another aspect of the present invention, there is provided a molding method for impregnating a base fiber material with a liquid resin in a cavity defined between a lower mold and an upper mold, in order to produce a molded article of a fiber-reinforced plastic.

In the above-described method, a first sealing member and a second sealing member are disposed respectively on the lower and the upper mold, or both the first sealing member and the second sealing member are disposed on the lower mold or the upper mold, and at least one of the lower mold and the upper mold has an exhaust passage.

The method comprises the steps of:

when the upper mold is relatively lowered toward the lower mold, using the first sealing member to form an enclosed space containing a production cavity between the lower mold and the upper mold;

after formation of the enclosed space, discharging a gas in the enclosed space from the exhaust passage;

after discharge of the gas in the enclosed space and when the upper mold is relatively lowered further toward the lower mold, using the second sealing member to divide the enclosed space into the production cavity and a sealed room, wherein the sealed room is formed between the first sealing member and the second sealing member and communicates with the exhaust passage;

after division of the enclosed space, supplying the liquid resin to the production cavity;

pressing the lower mold or the upper mold against the liquid resin in order to spread the liquid resin along the base fiber material;

hardening the liquid resin, with which the base fiber material has been impregnated, to thereby prepare the molded article; and releasing the molded article from the lower mold and the upper mold.

In the present method, the above-described molded FRP article having a large thickness or a high fiber volume content can be produced efficiently with satisfactory strength and high yield.

After formation of the sealed room, the sealed room may be opened to atmosphere by way of the exhaust passage. In this case, the liquid resin can easily be prevented from being drawn into the sealed room and the exhaust passage.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A preferred embodiment of a molding method of the present invention for producing a molded article of a fiber-reinforced plastic (a molded FRP article) using the molding apparatus of the present invention will be described in detail below with reference to the accompanying drawings.

Figure 1:
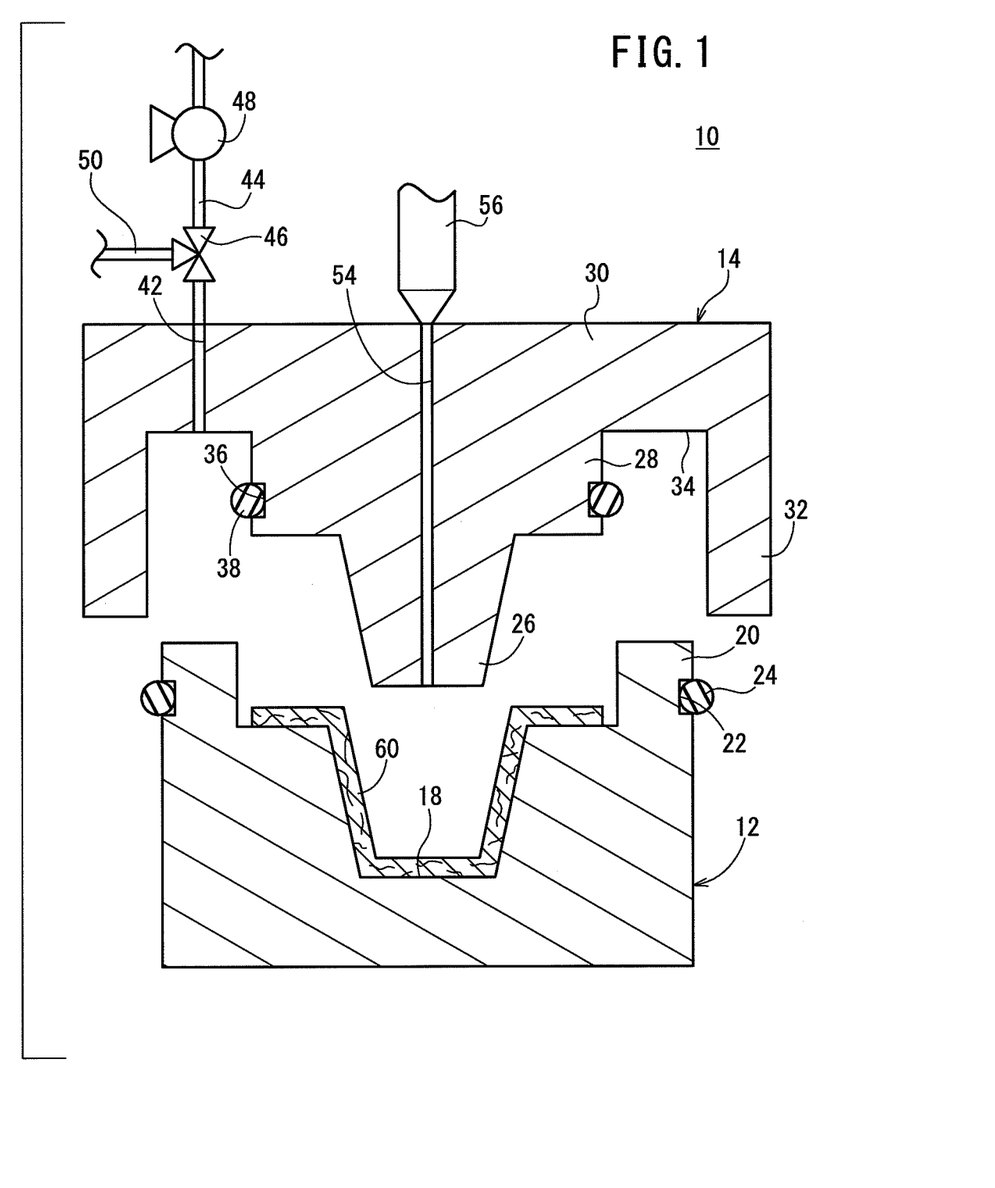
FIG. 1 is a schematic vertical cross-sectional view of a principal part of a fiber-reinforced plastic molding apparatus in an open state according to an embodiment of the present invention.

FIG. 1 is a schematic vertical cross-sectional view of a principal part of a fiber-reinforced plastic molding apparatus 10 (hereinafter referred to simply as a molding apparatus 10) according to the present embodiment. The molding apparatus 10 contains a lower mold 12 and an upper mold 14 as a molding tool. A production cavity 16 is formed between the lower mold 12 and the upper mold 14 (see FIGS. 3 and 4). In FIG. 1, the molding apparatus 10 is shown in an open state.

The lower mold 12 is a stationary mold, which is fixed in a given position. The lower mold 12 is a so-called female mold having a vertically extending depression (cavity forming depression 18) defining a cavity therein. On an edge of the upper surface of the lower mold 12, a protruding portion 20, which extends toward the upper mold 14, is formed around the cavity forming depression 18.

A first groove 22 is formed around the outer surface of the protruding portion 20. A first sealing member 24 is inserted into the first groove 22. A significant portion of the first sealing member 24 protrudes from the first groove 22.

On the other hand, the upper mold 14 is a movable mold, which can be lowered and raised (moved closer to and away from the lower mold 12) by an elevating mechanism (not shown). The upper mold 14 is a so-called male mold having a protrusion (cavity forming protrusion 26) therein. The cavity forming protrusion 26 is introduced into the cavity forming depression 18 in a closed state. The production cavity 16 is formed when the cavity forming protrusion 26 is introduced into the cavity forming depression 18 (see FIG. 4).

The upper mold 14 further includes a column 28 and a base 30. The cavity forming protrusion 26 is connected to the base 30 by way of the column 28.

A surrounding wall 32, which extends toward the lower mold 12, is formed on an edge of the lower surface of the base 30. In the closed state, the outer surface of the protruding portion 20 is surrounded by the surrounding wall 32. Therefore, in the closed state, a relatively depressed insertion portion 34 is formed between the column 28 and the surrounding wall 32. Thus, the insertion portion 34 is formed by a side surface of the column 28, a lower surface of the base 30, and an inner surface of the surrounding wall 32.

A second groove 36 is formed around the side surface of the column 28 (i.e., on the insertion portion 34). A second sealing member 38 is inserted into the second groove 36. A significant portion of the second sealing member 38 protrudes from the second groove 36, in the same manner as the first sealing member 24.

As will be described hereinafter, the protruding portion 20 is inserted into the insertion portion 34. Then, the first sealing member 24 is brought into contact with the inner surface of the surrounding wall 32, and the second sealing member 38 is brought into contact with the inner surface of the protruding portion 20 (see FIG. 3). As a result, a room which is separated from the production cavity 16 (hereinafter referred to as a sealed room 40) is formed between the first sealing member 24 and the second sealing member 38.

The base 30 has an exhaust passage 42 that communicates with the sealed room 40. The exhaust passage 42 is connected with an exhaust tube 44. A three-way valve 46 and a pump (exhaust unit) 48 are arranged on the exhaust tube 44 in this order from the exhaust passage 42.

Figure 2:
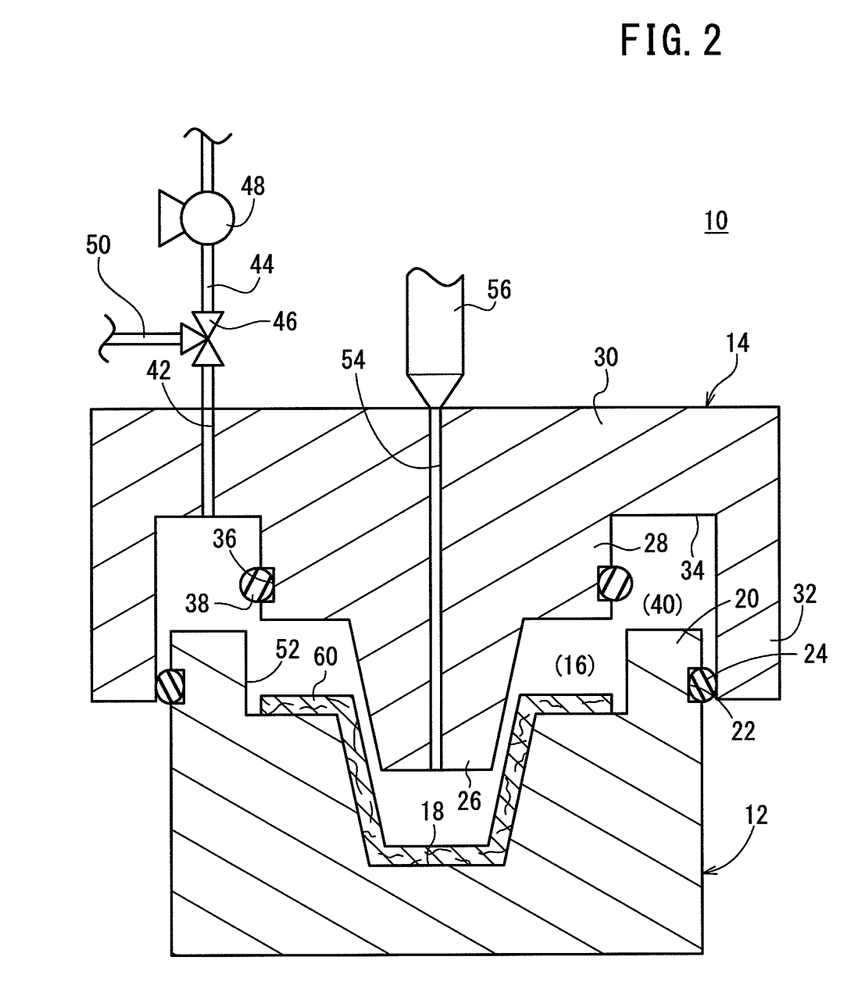
FIG. 2 is a schematic vertical cross-sectional view of an enclosed space formed between a lower mold and an upper mold during a process of changing the molds from the open state shown in FIG. 1 to a closed state.

The three-way valve 46 is further connected such that an open tube 50 thereof is opened to atmosphere. Thus, the three-way valve 46 acts to switch between a flow path that communicates with the pump 48 and a flow path in communication with atmosphere. When the flow path that communicates with the pump 48 is selected, gas in an enclosed space 52, which will be described later, is discharged by the pump 48 (see FIG. 2). On the other hand, when the flow path in communication with atmosphere is selected, the sealed room 40 is opened to atmosphere. Thus, the three-way valve 46 acts as a sealed room opening and closing unit. One of the three ports in the three-way valve 46 may be opened basically to atmosphere without going through the open tube 50.

The upper mold 14 has a runner 54 that extends from the base 30, through the column 28, and to the cavity forming protrusion 26. The runner 54 functions as a supply channel for supplying liquid resin 62 from an injector 56 to the production cavity 16 (see FIG. 3).

The molding apparatus 10 according to the present embodiment is constructed basically as described above. Operations and advantages of the molding apparatus 10 will be described below, in relation to an FRP molding method according to the present embodiment.

As shown in FIG. 1, while the molding apparatus 10 is maintained in an open state, a base fiber material 60 for forming a molded FRP article 64 (see FIG. 5) is placed in the cavity forming depression 18. During this step, the lower mold 12 and the upper mold 14 are separated from each other, and a space, which is opened to atmosphere, is formed between the lower mold 12 and the upper mold 14. Further, during this step, the three-way valve 46 is closed.

Next, the elevating mechanism is driven in order to lower the upper mold 14 toward the lower mold 12. In the lowering step, the inner surface of the surrounding wall 32 in the upper mold 14 faces toward the outer surface of the protruding portion 20 in the lower mold 12. When the inner surface of the surrounding wall 32 comes into contact with the first sealing member 24, the gap between the protruding portion 20 and the surrounding wall 32 is sealed by the first sealing member 24. As a result, the enclosed space 52, which is shielded from atmosphere, is formed between the lower mold 12 and the upper mold 14. As is clear from FIGS. 2 to 4, the enclosed space 52 includes the production cavity 16 and the sealed room 40 in a connected state.

After the enclosed space 52 is formed in this manner, the pump 48 is driven, and the three-way valve 46 is operated to select the flow path that communicates with the pump 48. Thus, the exhaust tube 44 communicates with the enclosed space 52, so that air in the enclosed space 52 can be discharged by the pump 48. Consequently, the inner pressure of the enclosed space 52 is reduced to a negative pressure of about 50 to 100 kPa.

Figure 3:
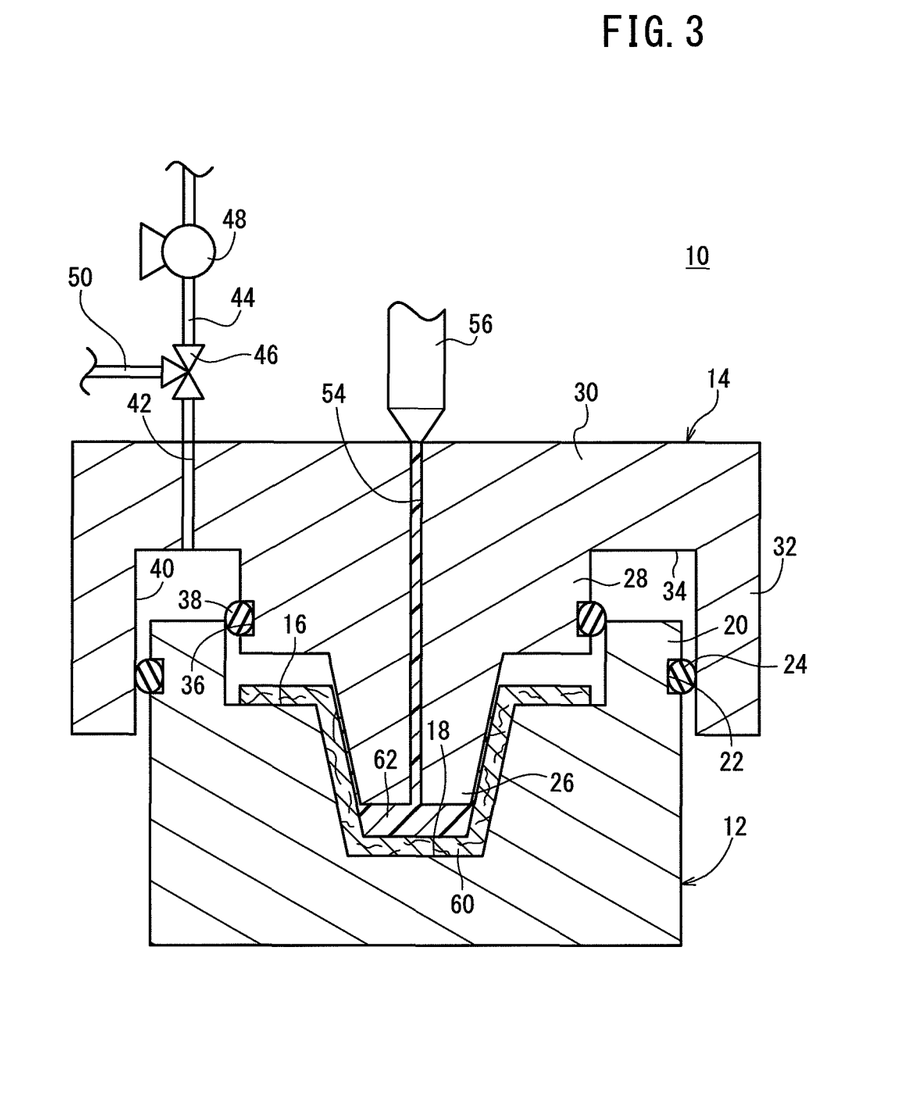
FIG. 3 is a schematic vertical cross-sectional view of a sealed room and a production cavity formed by dividing the enclosed space during a process of changing the molds from the state shown in FIG. 2 to the closed state, while a liquid resin is being supplied to the production cavity.

The upper mold 14 also is lowered continuously while the air in the enclosed space 52 is discharged. Therefore, as shown in FIG. 3, the cavity forming protrusion 26 is introduced into the cavity forming depression 18, and moves closer toward the base fiber material 60. In addition, the protruding portion 20 moves closer toward the insertion portion 34, so that the inner surface of the protruding portion 20 confronts the side surface of the column 28. Thus, the molding apparatus 10 is brought further in proximity to the closed state.

When the inner surface of the protruding portion 20 comes into contact with the second sealing member 38, the gap between the protruding portion 20 and the column 28 is sealed by the second sealing member 38. Meanwhile, the gap between the protruding portion 20 and the surrounding wall 32 is maintained in a sealed state by the first sealing member 24. Therefore, the sealed room 40 is formed between the first sealing member 24 and the second sealing member 38. As shown clearly in FIG. 3, the sealed room 40 is separated from the production cavity 16 by the second sealing member 38. In other words, the enclosed space 52 is divided into the sealed room 40 and the production cavity 16, and the sealed room 40 and the production cavity 16 are separated from each other.

At this point, the three-way valve 46 is closed, and the pump 48 is deactivated to stop discharge of air from the enclosed space 52. The time at which the sealed room 40 is formed can be calculated from the lowering speed of the upper mold 14 and the positions of the first sealing member 24 and the second sealing member 38. The timing at which discharge of air is stopped may be selected based on the calculated time.

Next, the liquid resin 62 is supplied from the injector 56. Preferred examples of the liquid resin 62 include ε-caprolactam resins and epoxy resins. In the event that ε-caprolactam resin is used, a catalyst or an activator may be supplied simultaneously therewith. Examples of suitable catalysts include alkali metals such as sodium, alkaline-earth metals, and oxides, hydroxides, and hydrides thereof. Examples of suitable activators include isocyanates, acyllactams, isocyanurate derivatives, acid halides, and carbamide lactams.

In the event that an epoxy resin is used, a hardener may be supplied simultaneously therewith. Examples of suitable hardeners include acid anhydrides, aliphatic polyamines, amide-amines, polyamides, Lewis bases, and aromatic polyamines.

The liquid resin 62 moves through the runner 54 and is introduced into the production cavity 16 from the end of the cavity forming protrusion 26. The liquid resin 62 is injected under a predetermined pressure by the injector 56, and flows comparatively easily between the base fiber material 60 and the cavity forming protrusion 26. When the amount of injected liquid resin 62 reaches a predetermined level, injection of the liquid resin 62 is stopped.

Before, after, or during the same time that injection of the liquid resin 62 is stopped, the three-way valve 46 is operated to select the flow path that is in communication with atmosphere. Thus, the open tube 50 is connected with the sealed room 40, so that the sealed room 40 is opened to atmosphere. Consequently, the internal pressure of the sealed room 40 increases to atmospheric pressure.

Figure 4:
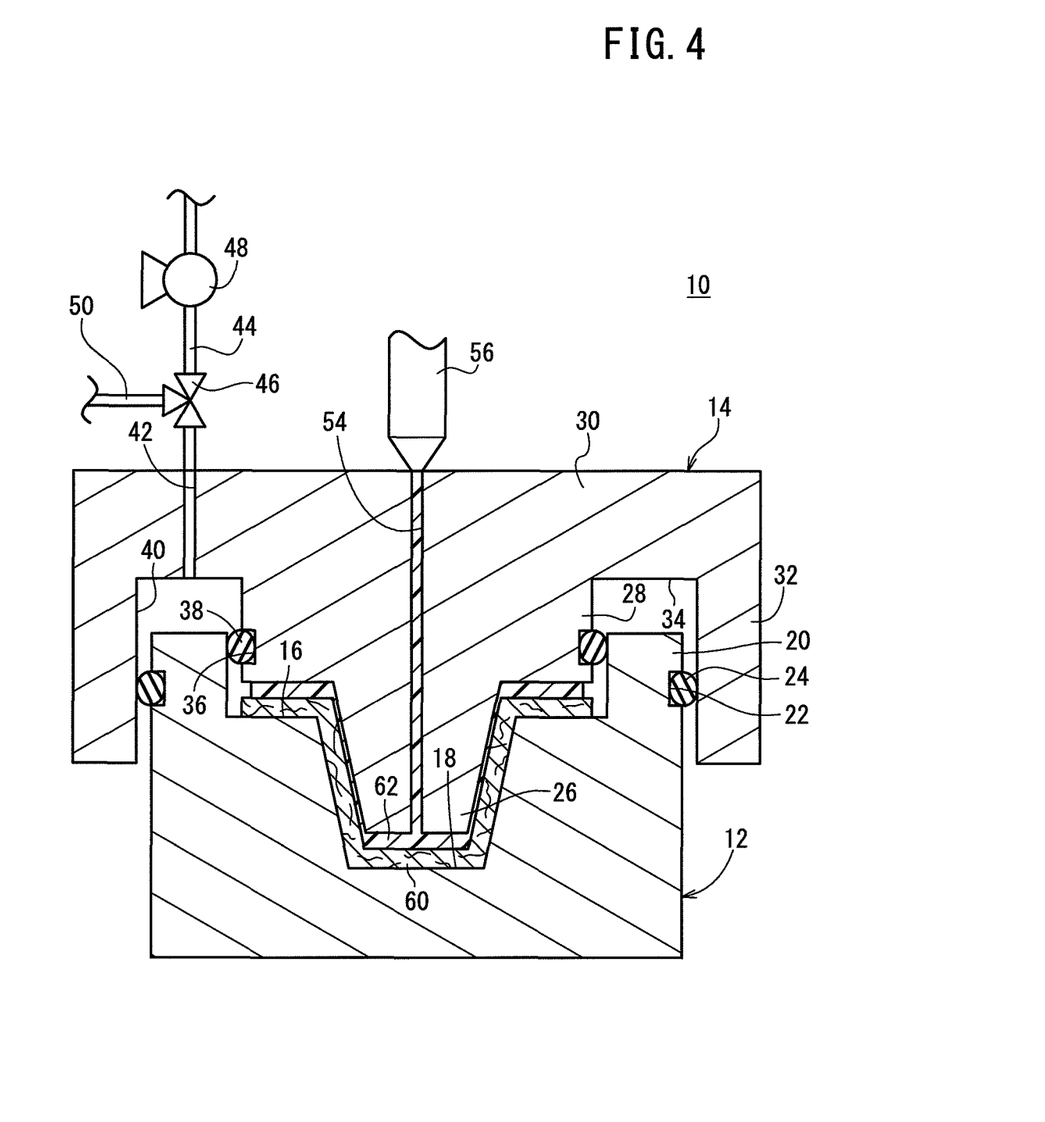
FIG. 4 is a schematic vertical cross-sectional view of the liquid resin spread along a base fiber material in the closed state.

Upon further lowering of the upper mold 14, the molding apparatus 10 is changed to the closed state, as shown in FIG. 4. In the closed state, the protruding portion 20 is introduced or is inserted into the insertion portion 34. Meanwhile, the cavity forming protrusion 26 is introduced further into the cavity forming depression 18 and presses against the liquid resin 62. As a result of being pressed thereby, the liquid resin 62 expands (spreads) along the base fiber material 60. Since the liquid resin 62 is pressed by the cavity forming protrusion 26 (the upper mold 14) while the production cavity 16 is kept under a negative pressure, the liquid resin 62 can easily be spread.

In the present embodiment, during the process of changing from the open state (see FIG. 1) to the closed state (see FIG. 4), the inner pressure of the enclosed space 52 containing the production cavity 16 is reduced to a negative pressure. After formation of the production cavity 16 and prior to achievement of the closed state, the liquid resin 62 is supplied to the production cavity 16. Therefore, in the closed state, the liquid resin 62 in the production cavity 16, which is under a negative pressure, is pressed by the upper mold 14 (the cavity forming protrusion 26). Thus, the liquid resin 62 can be spread sufficiently, and consequently, the liquid resin 62 can be distributed entirely over the base fiber material 60.

In the present embodiment, since the liquid resin 62 can be spread sufficiently, a molded FRP article 64 (shown in FIG. 5) having a relatively large thickness or a relatively high fiber volume content can be produced.

The second sealing member 38 is located between the sealed room 40 and the production cavity 16. Therefore, even in the case that an excessive amount of liquid resin 62 is supplied above the base fiber material 60, the liquid resin 62 can eventually be blocked by the second sealing member 38.

In the present embodiment, as described above, the inner pressure of the sealed room 40 is increased to atmospheric pressure, while the production cavity 16 remains in a negative pressure state. The inner pressure of the sealed room 40 differs from and is higher than that of the production cavity 16. Therefore, even in the event that liquid resin 62 cannot be blocked sufficiently due to a defect in the second sealing member 38, the liquid resin 62 is pressed into the sealed room 40 by atmospheric air. Thus, liquid resin 62 can be prevented from being introduced into the sealed room 40.

As described above, according to the present embodiment, leakage of liquid resin 62 to the outside from the production cavity 16 can be prevented. Therefore, liquid resin 62 can be prevented from being introduced into the sealed room 40, the exhaust passage 42, the exhaust tube 44, or the three-way valve 46. Consequently, a reduction in the inspiratory force in a subsequent molding can be prevented.

In addition, in the present embodiment, there is no need to take apart and clean the three-way valve 46 or to replace the three-way valve 46. Therefore, the molding method can be carried out repeatedly without interruptions. Thus, molding can be performed more frequently per unit time, whereby production efficiency of the molded FRP article 64 can be improved.

Figure 5:
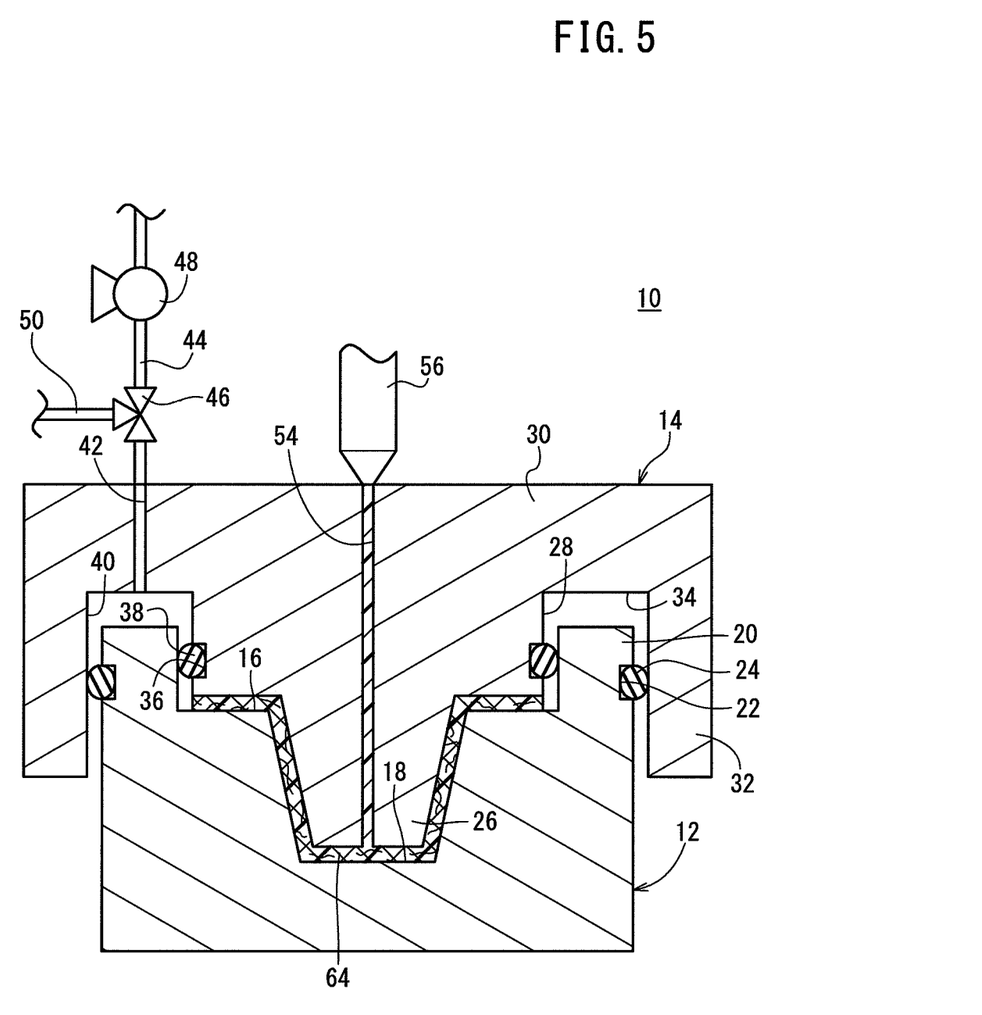
FIG. 5 is a schematic vertical cross-sectional view of a molded FRP article prepared by impregnating the base fiber material with the liquid resin.

The liquid resin 62, which has been spread in the foregoing manner, permeates the fibers in the base fiber material 60. As shown in FIG. 5, the base fiber material 60 is impregnated with the liquid resin 62. Then, at a predetermined time, the liquid resin 62 becomes hardened. Consequently, the molded FRP article 64 having a desired shape is produced.

Figure 6:
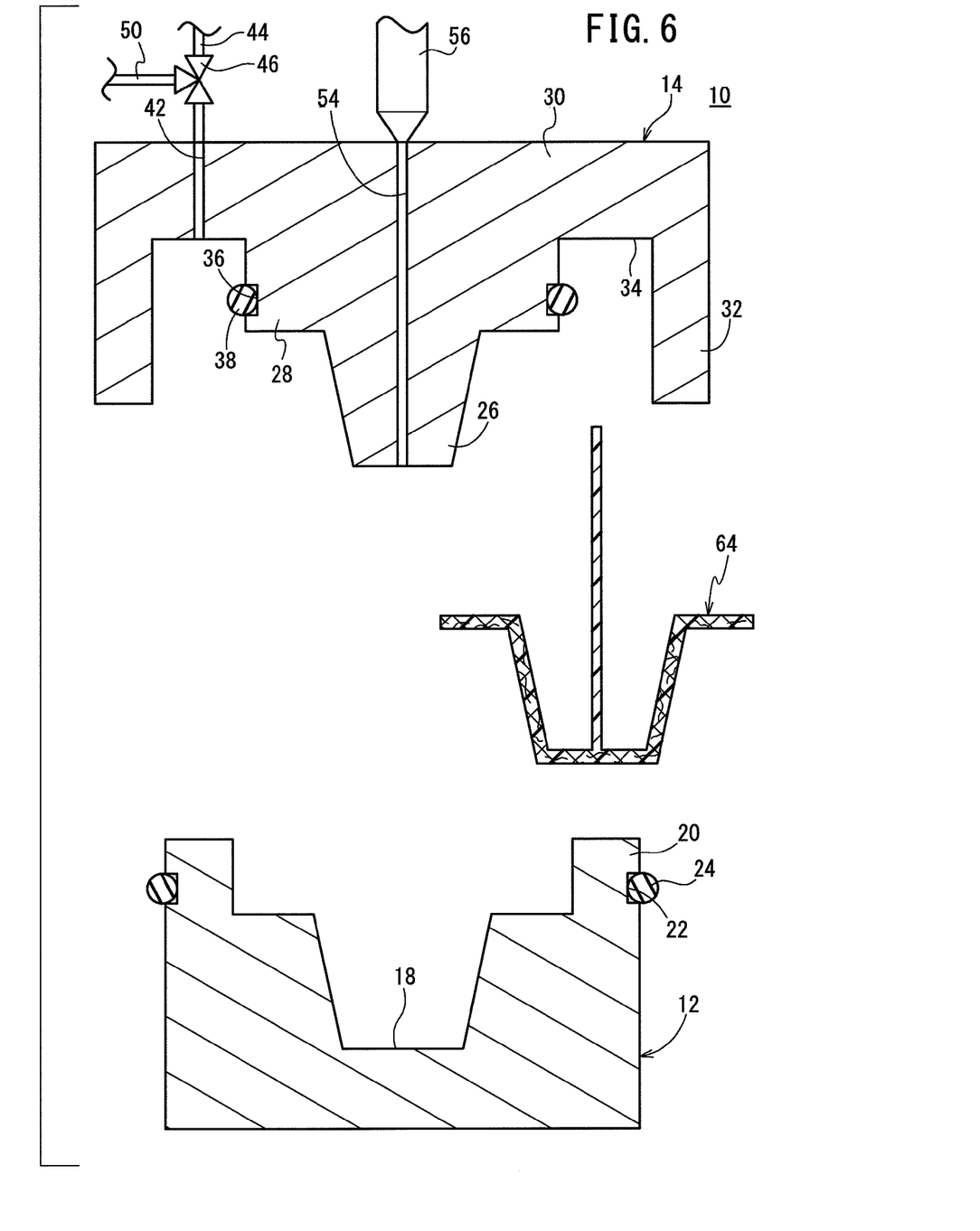
FIG. 6 is a schematic vertical cross-sectional view of the molded FRP article after being released from the opened molds.

Thereafter, as shown in FIG. 6, the upper mold 14 is raised by the elevating mechanism, whereby the molding apparatus 10 is returned to the open state. Then, the molded FRP article 64 is released from the molding apparatus 10. Stated otherwise, so-called demolding is carried out. For example, during this step, an ejector pin (not shown) or the like may be used.

As described above, the liquid resin 62 remains in the production cavity 16, and is prevented from being drawn into the exhaust passage 42. Therefore, leakage of liquid resin 62 to the outside from the production cavity 16 can be prevented. Further, lack of liquid resin 62 due to leakage thereof can be prevented, and the occurrence of an unimpregnated area in the molded FRP article 64 can be avoided. Consequently, a molded FRP article having satisfactory strength can be produced.

Thus, in the present embodiment, a molded FRP article 64 having a large thickness or a high fiber volume content can be produced efficiently with satisfactory strength and high yield.

The present invention is not limited to the above embodiment. Various changes and modifications may be made to the embodiment without departing from the scope of the invention.

For example, a two-way valve may be used instead of the three-way valve 46. In this case, the step of supplying the liquid resin 62 and subsequent steps thereafter may be carried out without opening the sealed room 40 to atmosphere.

In contrast to the aforementioned embodiment, the first sealing member 24 and the second sealing member 38 may be disposed respectively on the upper mold 14 and the lower mold 12. Alternatively, both the first sealing member 24 and the second sealing member 38 may be disposed on one of the lower mold 12 and the upper mold 14.

Figure 7:
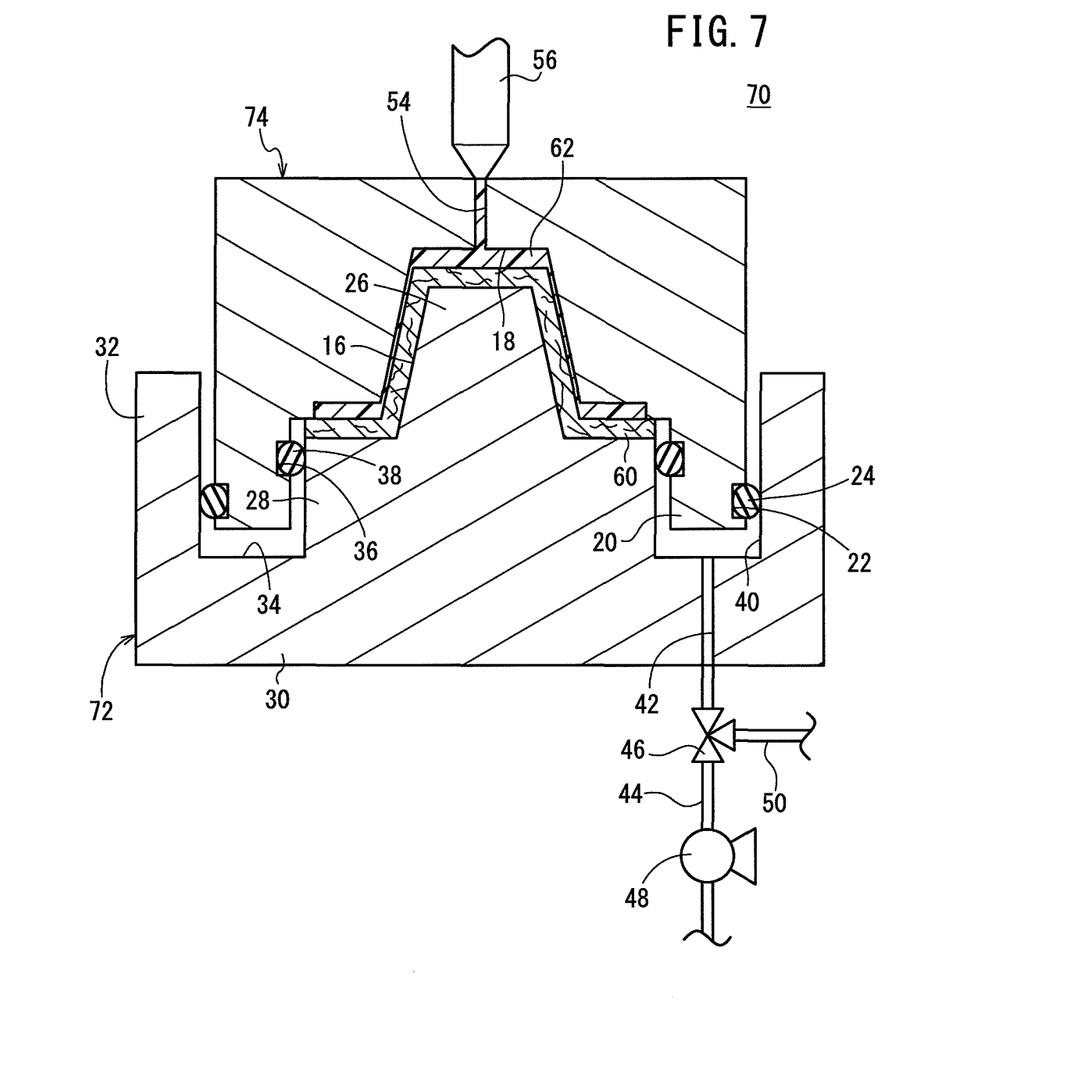
FIG. 7 is a schematic vertical cross-sectional view of a principal part of a fiber-reinforced plastic molding apparatus according to another embodiment.

An alternative example is shown in FIG. 7. In this example, in a molding apparatus 70, a lower mold 72 is used as a male mold, and an upper mold 74 is used as a female mold. To facilitate understanding, other components shown in FIG. 7 are represented by the same reference numerals as used in FIGS. 1 to 6.

As shown clearly in FIG. 7, in the molding apparatus 70, the first sealing member 24 is disposed on the outer surface of the protruding portion 20 in the upper mold 74, and the second sealing member 38 is disposed on the inner surface thereof. Furthermore, the exhaust passage 42, which communicates with the sealed room 40, is formed in the lower mold 12.

Figure 8:
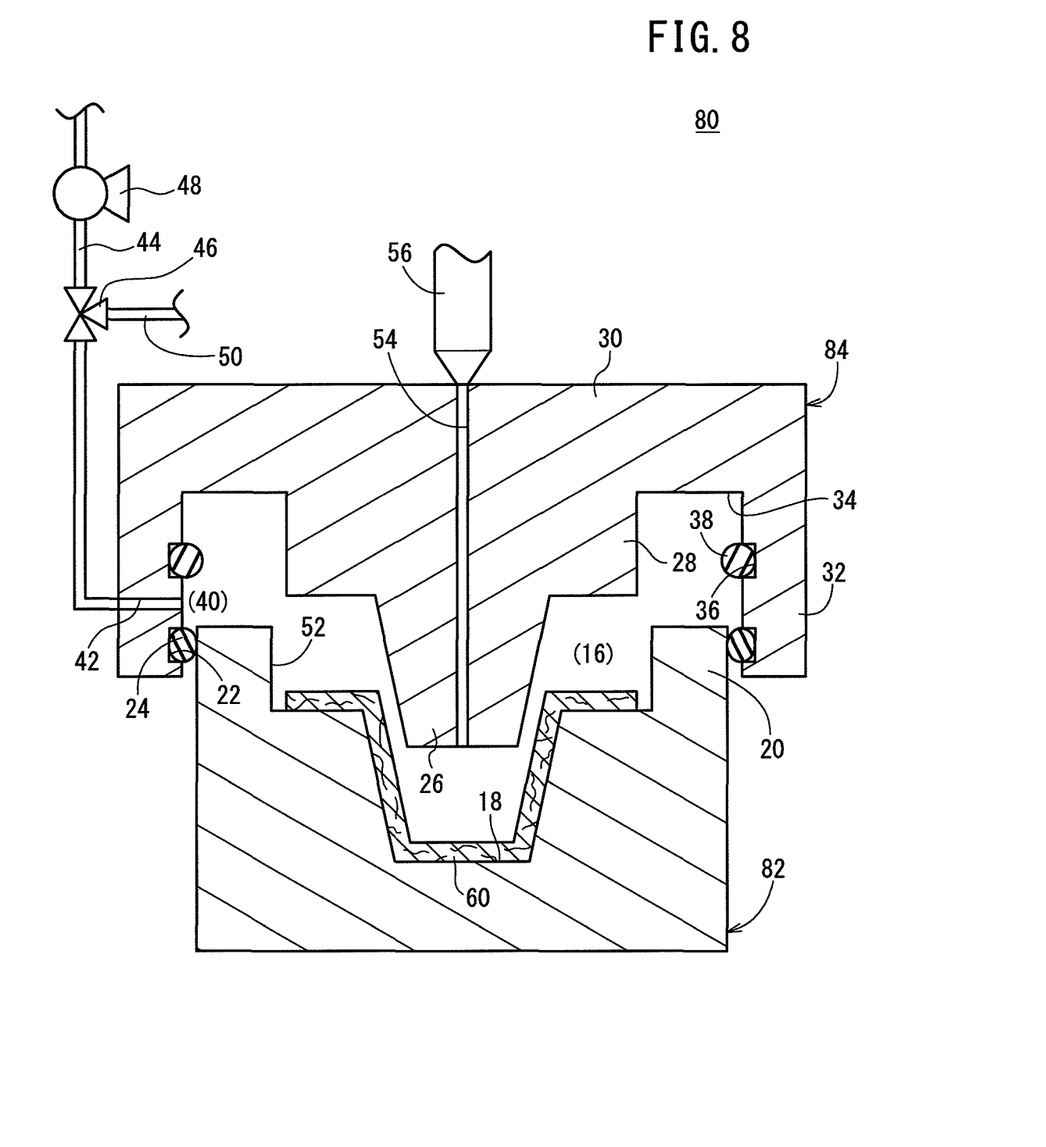
FIG. 8 is a schematic vertical cross-sectional view of a principal part of a fiber-reinforced plastic molding apparatus according to yet another embodiment.

Another example is shown in FIG. 8. In this example, in a molding apparatus 80, a lower mold 82 is used as a female mold, and an upper mold 84 is used as a male mold. To facilitate understanding, other components of the molding apparatus 80 are represented by the same reference numerals as used in FIGS. 1 to 6, as well as in FIG. 7.

Figure 9:
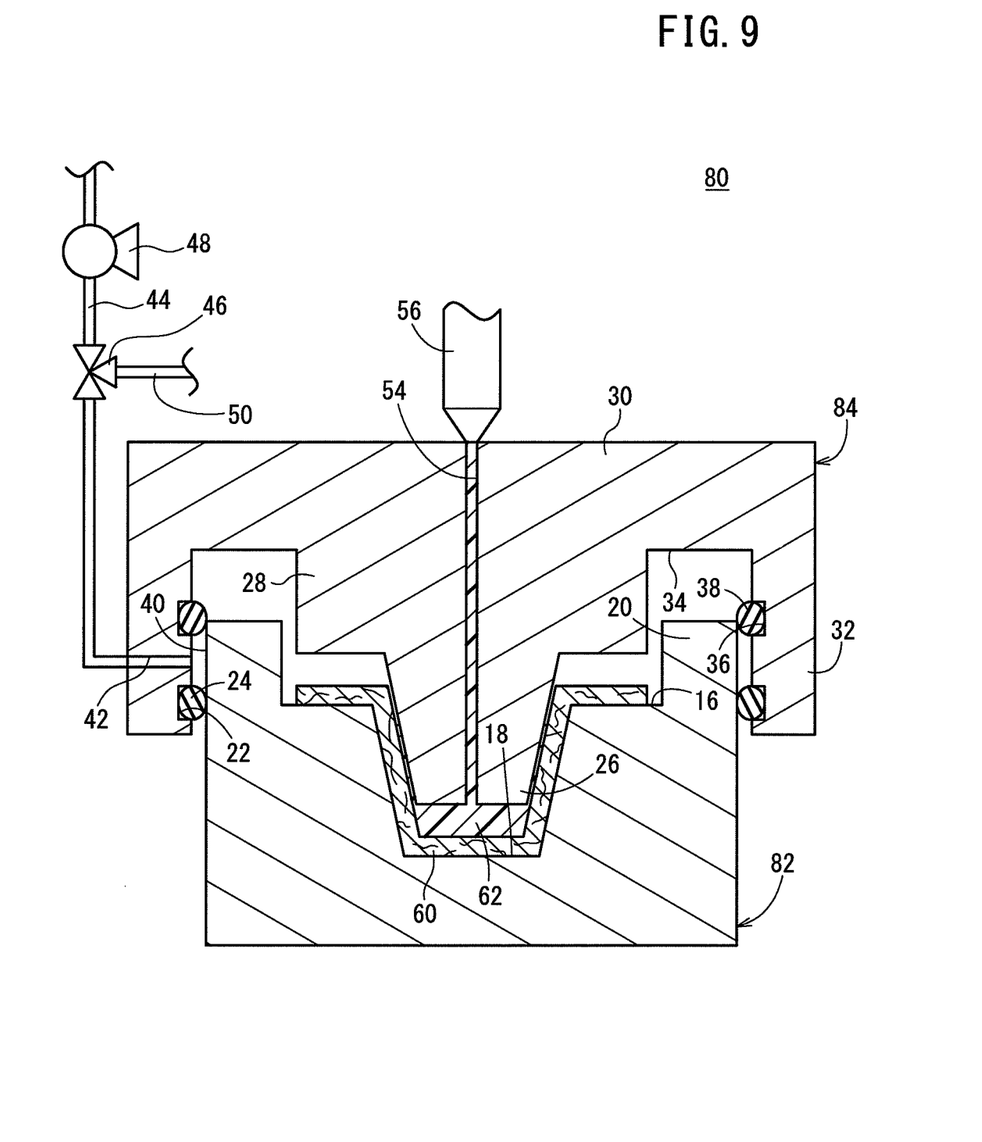
FIG. 9 is a schematic vertical cross-sectional view of a production cavity and a sealed room formed by dividing an enclosed space during a process of changing an upper mold from the state shown in FIG. 8 to a lowered state.

In FIG. 8, the enclosed space 52 is formed by the first sealing member 24. In this state, air in the enclosed space 52 is discharged by the pump 48. As shown in FIG. 9, the upper mold 84 is lowered continuously, and the enclosed space 52 is divided by the second sealing member 38 into the production cavity 16 and the sealed room 40. Thereafter, the liquid resin 62 is injected from the injector 56 into the production cavity 16.

The exemplary molding apparatuses 70 and 80 can also be used in the molding method, in the same manner as the aforementioned molding apparatus 10.

What is claimed is:

1. A molding apparatus comprising a lower mold, an upper mold, and an exhaust unit, for impregnating a base fiber material with a liquid resin in a cavity defined between the lower mold and the upper mold, in order to produce a molded article of a fiber-reinforced plastic,
wherein:
one of the lower mold and the upper mold has a protruding portion that is oriented toward a corresponding shape of the other of the lower mold and the upper mold;
the corresponding shape includes a depressed insertion portion into which the protruding portion is inserted, and a surrounding wall that surrounds an outer surface of the protruding portion;
a first sealing member and a second sealing member are disposed respectively on a side surface of the protruding portion and a side surface of the surrounding wall, or both the first sealing member and the second sealing member are disposed on the side surface of the protruding portion or the side surface of the surrounding wall, wherein the side surface of the protruding portion and side surface of the surrounding wall are not oriented normal to a direction of travel of the upper mold;
at least one of the lower mold and the upper mold has an exhaust passage;
when the upper mold is relatively lowered toward the lower mold, the first sealing member is used to form an enclosed space containing a production cavity between the lower mold and the upper mold;
after formation of the enclosed space and when the upper mold is relatively lowered further toward the lower mold, the second sealing member is used to divide the enclosed space into the production cavity and a sealed room, the sealed room being formed between the first sealing member and the second sealing member and communicating with the exhaust passage; and
prior to formation of the sealed room, a gas in the enclosed space is discharged from the exhaust passage by the exhaust unit.

2. The molding apparatus according to claim 1, wherein the base fiber material is placed in the production cavity, which is divided by the second sealing member.

3. The molding apparatus according to claim 1, further comprising a sealed room opening unit capable of opening the sealed room to atmosphere by way of the exhaust passage.

4. The molding apparatus according to claim 3, wherein the sealed room opening unit comprises a three-way valve.

5. The molding apparatus according to claim 1, wherein:
one of the first sealing member and the second sealing member is disposed on one of the protruding portion and the insertion portion; and
another of the first sealing member and the second sealing member is disposed on another of the protruding portion and the insertion portion.

6. The molding apparatus according to claim 1, wherein:
both the first sealing member and the second sealing member are disposed on one of the protruding portion and the insertion portion.

* * * * *